United States Patent [19]
McLain

[11] 3,733,453
[45] May 15, 1973

[54] HIGH FREQUENCY WELD BOX
[75] Inventor: Charles D. McLain, Alton, Ill.
[73] Assignee: Olin Corporation, New Haven, Conn.
[22] Filed: Feb. 18, 1972
[21] Appl. No.: 227,472

[52] U.S. Cl. ............219/8.5, 219/10.53, 219/10.73
[51] Int. Cl. .............................................H05b 5/02
[58] Field of Search.....................219/8.5, 59, 10.53, 219/10.73, 78, 60 A, 154, 149, 102

[56] References Cited

UNITED STATES PATENTS

| | | | |
|---|---|---|---|
| 3,037,105 | 5/1962 | Kohlev | 219/8.5 |
| 3,330,931 | 7/1967 | Tour et al. | 219/8.5 |
| 2,181,445 | 11/1939 | Adams | 219/8.5 |
| 2,083,034 | 6/1937 | Mishler | 219/8.5 |
| 2,059,300 | 11/1936 | Adams | 219/8.5 |
| 1,986,369 | 1/1935 | Sessions | 219/8.5 |
| 3,648,005 | 3/1972 | Rudd | 219/8.5 |
| 2,689,297 | 9/1954 | Tudbury | 219/8.5 X |

Primary Examiner—Thomas J. Kozma
Assistant Examiner—B. A. Reynolds
Attorney—Robert H. Bachman et al.

[57] ABSTRACT

A weld box and an apparatus for welding metal strip into tubing having improved electrical efficiency. The improvements in electrical efficiency are obtained by shielding magnetic components of the weld box from the induction field of the induction coil which is employed. Alternatively, and preferably, those magnetic parts which are exposed to the induction field have been formed of non-magnetic materials such as copper and copper base alloys. Further, short circuit paths within the weld box have been substantially eliminated by interposing insulating means between components of the weld box in the short circuit path which do not move with respect to one another.

16 Claims, 4 Drawing Figures

PRIOR ART

HIGH FREQUENCY WELD BOX

BACKGROUND OF THE INVENTION

This invention deals with an improved weld box design for welding metal strip into tube. This invention is particularly directed to a weld box design suitable for use in a process of high frequency forge welding. Typical examples of prior art apparatuses and processes are set forth in U.S. Pat. Nos. 3,037,105, granted May 29, 1962; 2,794,108, granted May 28, 1957; and 2,818,488, granted Dec. 31, 1957.

To form and weld strip into tube by induction heating, one may employ a series of roll stands or dies designed to progressively form the flat strip into a tubular shape. The tube shaped strip then passes through an encircling induction coil which supplies sufficient electrical energy to heat the strip edges to the welding temperature. The strip then passes to a weld box containing at least a pair of opposing rolls which push the heated strip edges together with sufficient force to forge weld the edges together thereby forming a fluid and pressure tight tube.

Since copper and copper base alloys are non-magnetic and therefore possess a low permeability and, further, since they have high conductivity, more power is required to heat the strip edges to the welding temperature than if one were welding a metal or alloy having a higher permeability or a lower conductivity, or a combination of these properties. This increased power requirement for copper and copper base alloys is difficult to meet because a substantial portion of the power from the induction coil is drawn off by the induced currents in the metal framework and other parts of the weld box which are near the induction coil. This problem is particularly acute since the framework materials and components such as bearings are commonly formed of steel having a high magnetic permeability and low conductivity as compared to copper and copper base alloys.

The induced currents in the steel framework and other components of the weld box cause them to heat up and markedly reduce electrical efficiency. This results in a decrease in operating speed of the welding apparatus and a deterioration in weld quality due to the slower speed. Further, there is a mechanical instability introduced which is associated with the expansion of the steel framework and other parts of the weld box due to theri being heated up.

Short circuit paths also generally exist within the weld box which also reduce the power input to the strip edges and decrease the overall efficiency of the welding apparatus.

SUMMARY OF THE INVENTION

In accordance with this invention, the aforenoted problems which cause the loss of electrical efficiency and deterioration in weld quality have been overcome by providing in accordance with one embodiment a weld box wherein a non-magnetic shielding having high conductivity has been provided over at least those magnetic parts and framing of the weld box which face the induction coil, thereby shielding them from the induction coil and reducing the associated electrical losses and other problems. In a preferred version of this embodiment, the shielding is applied over all of the exposed surfaces of the magnetic portions of the framework and other parts of the weld box.

In another embodiment of this invention, the aforenoted problems are substantially eliminated by replacing the exposed framework and parts of the weld box formerly made of magnetic materials, such as steel, with non-magnetic materials having high conductivity.

A still further embodiment of this invention which is adapted to eliminate electrical losses due to short circuit paths within the weld box involves providing insulating spacers and other means in the weld box to substantially eliminate the short circuit paths.

It is accordingly an object of this invention to provide an improved weld box for high frequency forge welding by induction heating having improved electrical efficiency and mechanical stability.

It is another object of this invention to provide a weld box as above wherein substantially all of the magnetic metals and metals having low conductivity in the framework and other exposed parts have been eliminated and replaced by non-magnetic metals having high conductivity or have been shielded from the field of the induction coil by the interposition of a non-magnetic metal shielding having high conductivity.

It is a further object of this invention to provide a weld box as above wherein any short circuit paths which would occur in the welding box during welding are substantially eliminated by means of suitable insulation.

Other objects and advantages will become apparent from the following description and drawings.

DESCRIPTION OF THE PREFERRED EMBODIMENTS

Figure 1:
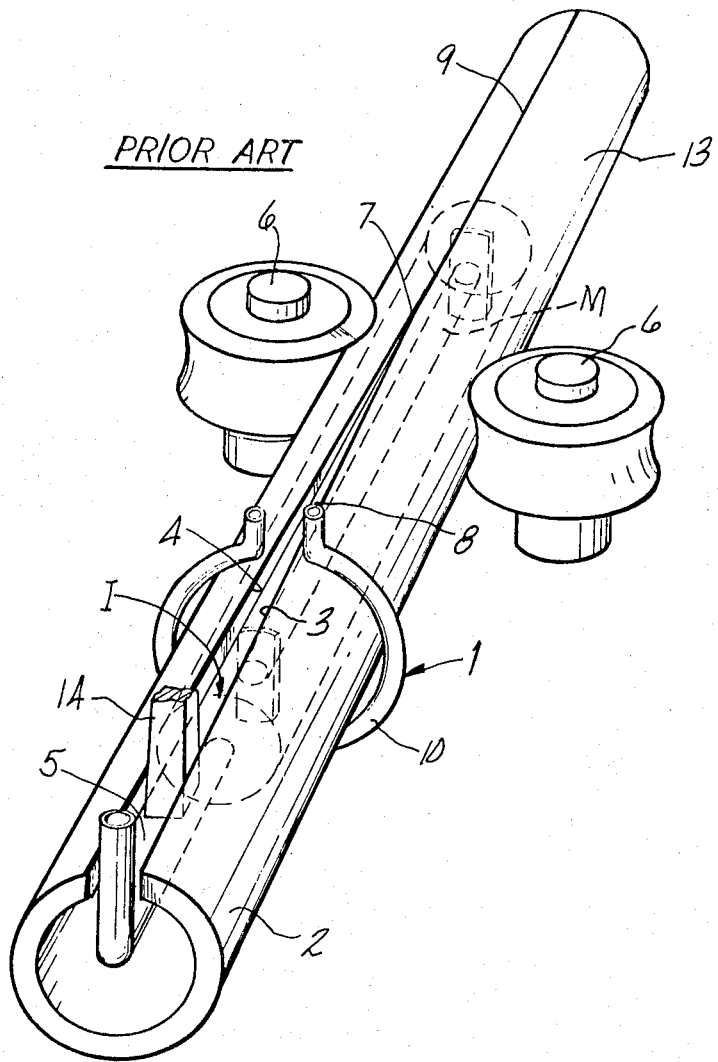
FIG. 1 is a schematic view of a typical prior art high frequency forge welding apparatus in which the weld box of this invention could be employed.

Referring now to the drawings and especially to FIG. 1, there is illustrated a typical welding apparatus 1 for welding metal strip in the form of a preformed open tube 2 into tubing. The apparatus is adapted to weld together the opposed edges 3 and 4 which form the longitudinal gap 5 in the open metal tubing 2.

The open tube 2 is formed in a forming mill (not shown) situated in line immediately preceding the apparatus 1. The forming mill is of conventional well known designs. The forming mill may contain a plurality of roll stands or dies which form metal strip into the open tube 2. It is to be understood that other roll stands may be situated in line immediately following the apparatus 1 to further form the tubing such as, for example, to correct out of roundness. The roll stands are generally power driven and, therefore, provide means for rapidly and longitudinally advancing the tubing. Alternatively, this means may be power driven weld rolls 6 as shown.

The weld rolls 6 comprise a pair of pressure rollers of known form which engage opposite sides of the tube 2 and cause the longitudinally extending gap 5 therein to become closed substantially at a weld point 7 forming a V-shaped gap 8. As the open tubing 2 advances to the weld point 7, the edges 3 and 4 at the gap 8 become welded together along the weld seam 9.

The edges 3 and 4 at the V-shaped gap 8 are heated by means of an induction coil 10 or contacts. The induction coil 10 shown is a single turn coil; however, a multiturn coil could be substituted for the single turn coil.

The coil 10 is formed of wrought metal tubing. The coil is electrically connected to a source of high frequency current, not shown. The high frequency current is normally at least 100 kilocycles per second and, preferably, at least 400 kilocycles per second or higher. The coil is also connected to a source of cooling medium (not shown) which flows through the tubing to keep it from overheating.

The apparatus 1 may also include the following elements as shown in FIG. 1. An impeder I may be included to improve the efficiency of the induction coil 10 by increasing the impedance of the high frequency current paths around the back of the open tube 2. This reduces the flow of current around the back of the tube 2 and increases the flow of current along the tube edges 3 and 4 running from a point on the tube edge 3 adjacent the coil 10 to the weld point 7 and back the opposing tube edge 4 to a point adjacent the coil 10. This results in more efficient heating of the edges 3 and 4 of the open tube 2, the edges being heated up to the welding temperature upon reaching the weld point 7.

The impeder I may be of any suitably known construction and comprises a schroud 11 connected to a hollow supporting arm 12 as shown extending down through the gap 8. The actual shape of the schroud 11 shown in FIG. 1 is merely schematic and it may have any suitable shape.

A source of cooling medium (not shown) such as water is connected to the hollow supporting arm 12 for flowing water into the schroud 11 and about a core of magnetic material M which is held therein. The magnetic material in the core should be of an insulating nature to provide a core substantially free of eddy current losses. The core is preferably a sintered magnetic oxide insulating material, preferably of types now well known which have a low loss factor and high volume resistivity. A suitable material is marketed under the name "Ferramic" by General Ceramic and Steatite Corporation, the permeability thereof being substantially greater than unity. The cooling medium which passes through the hollow supporting arm 12 flows within the schroud 11 and about the Ferramic core M to cool the core and is generally discharged within the welded tube 13.

Further, since the angle of the V-shaped gap 8 is important, a seam guide means 14 is generally included at a point in advance of the induction coil 10 to accurately space apart the edges of the tube 2 and, thereby, obtain the desired angle. The seam guide means may be formed of a suitable insulating material protruding down into the gap so that the roll stand preceding that position (not shown) will cause the tube gap edges 3 and 4 to be pressed against the opposite sides of the seam guide 14 whereby the edges are maintained with a uniform separation.

Figure 2:
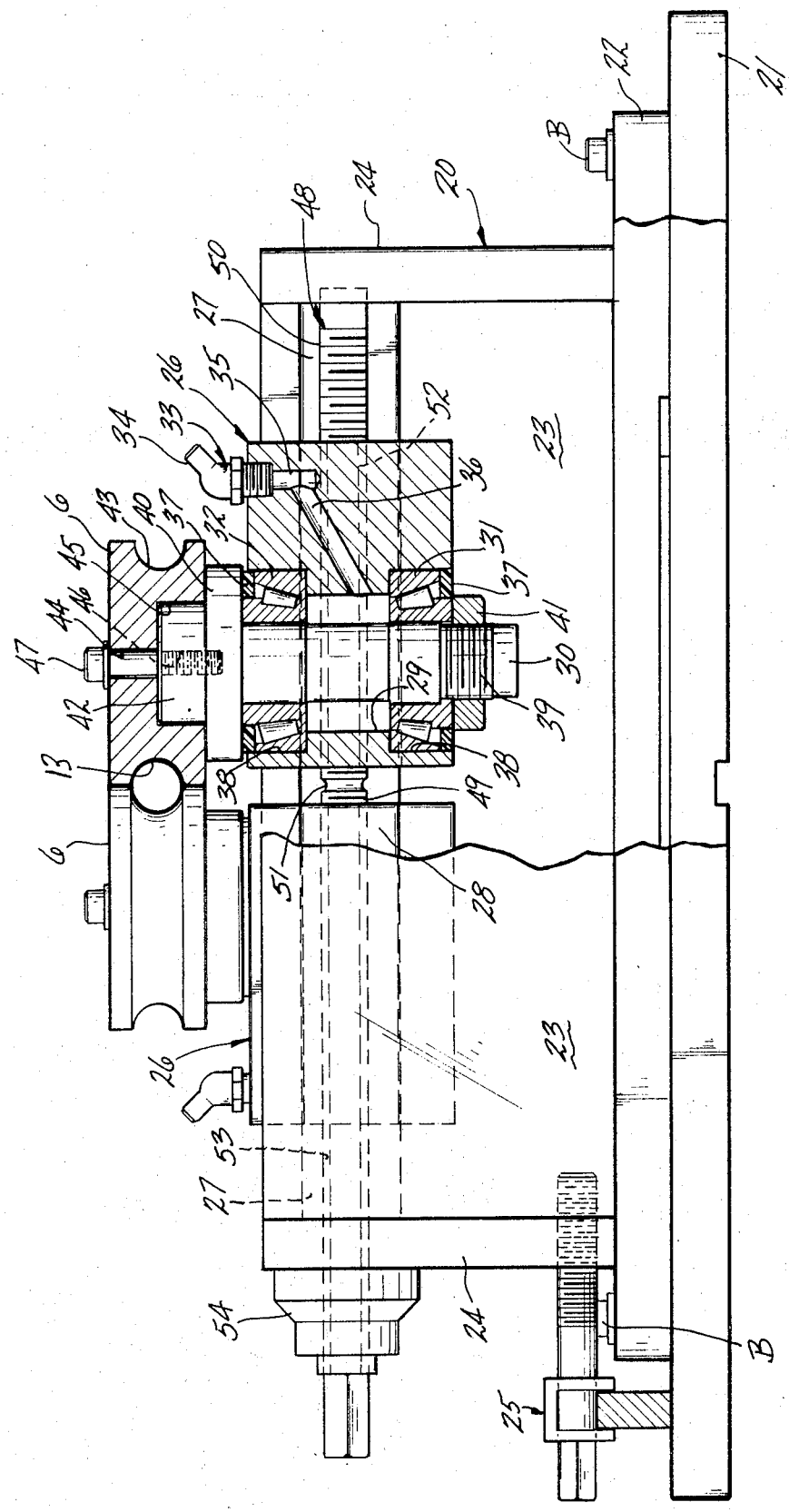
FIG. 2 is a partial cross sectional view of the weld box when viewed in the direction of tube travel during welding.

Referring now to FIG. 2, there is shown a partial cross section of a typical weld box 20 construction. The weld box 20 holds the weld rolls 6 in an adjustable relationship so that the distance between the rolls may be changed in order to change the degree of forge welding and further so they may be aligned with the longitudinal axis of the welded tube. The weld box 20 construction shown in FIG. 2 is typical of designs known in the art. The structural features of the weld box 20 of FIG. 2 will be discussed here briefly by way of example.

The weld box 20 illustrated in FIG. 2 is a two roll 6 weld box generally positioned in the horizontal direction on a heavy machine bed (not shown), which usually also carries the tube forming rolls or dies (not shown) which form the strip into the shape of an open tube 2 as in FIG. 1. The induction coil 10 of FIG. 1 would be positioned just in front of the weld box as shown in FIG. 2 and the tube 13 would be traveling in a direction away from the viewer.

The two roll weld box 20 shown in FIG. 2 is meant to be merely exemplary and any well known weld box construction can be adapted to improve its efficiency in accordance with this invention as will become apparent from the ensuing description. Therefore, the weld boxes may include more than two rolls, such as, for example, three roll and four roll weld boxes as are well known in the art.

In the weld box 20 of FIG. 2, there is a base plate 21 which is adapted to be mounted to the machine bed (not shown). Situated on top of the base plate 21 is the bottom plate 22 of the weld box 20 which is moveable in a horizontal direction with respect to the base plate 21 for purposes of aligning the central axis between the weld rolls 6 with the central axis of the forming mill rolls or dies (not shown). The box 20 itself is of a rectangular design having two side walls 23 and two end walls 24 connected together to form a rectangular box and also connected to the bottom plate 22. The walls 23 and 24 and bottom plate 22 are connected by means of conventional fasteners such as bolts or, more preferably, they may be welded together.

Movement of the weld box 20 with respect to the base plate 21 is accomplished by a screw adjustment 25. After proper alignment has been achieved, the bottom plate of the weld box is secured to the base plate by bolts B.

Each of the weld rolls 6 is carried in a moveable carriage 26. Each of the side walls 23 has a recessed keyway 27 machined in it which is adapted to slideably receive the moveable carriage 26.

On each side of each carriage 26 in correspondence with the side walls 23 of the weld box 20, there is a raised portion 28 or key which is adapted to ride within the keyways 27 in the side walls 23 of the weld box, thereby providing for horizontal movement of the weld rolls 6 in the weld box 20.

As shown by the sectioned carriage 26, each carriage has a hole 29 through which a stub shaft 30 passes. Bearings 31 and 32 are employed to provide for rotational movement of the stub shaft 30 within the carriage 26. Means 33 for lubricating the bearings 31 and 32 are provided as, for example, the fitting 34 and conduits 35 and 36 which communicate with the hole 29 and bearings 31 and 32. Seals 37 are provided to prevent any substantial amount of lubricant from escaping.

Each of the bearings 31 and 32 fits in counterbored portions 38 of the hole 29 extending in from the top and bottom of the carriage 26. The tolerances between the stub shaft 30, the bearings 31 and 32 and the counter-bored portions 38 of the carriage 26 must be kept very close so that alignment of the weld rolls 6 and their mechanical stability can be maintained.

At the bottom end of the stub shaft 30, there is a threaded portion 39 and at the top end, there is a flange 40 which rides on the top bearing 32. A retaining nut 41 is secured about the threaded portion 39 of the stub shaft 30 to lock the stub shaft in place. On the top of the flange 40 of the stub shaft 30 and integral therewith is a hub portion 42 about which the weld roll 6 is adapted to be secured.

The weld roll 6 as shown comprises a cylindrical roll having a hemispherical type groove 43 about its circumference. The shape of the groove is governed by the cross section of the tube being welded and may be selected as desired. The weld roll 6 has a hole 44 extending centrally through it from its top surface and a counter-bored portion 45 concentric with the hole 44 extending in from the bottom surface of the roll and adapted to fit about the hub 42 of the stub shaft 30. There is a threaded hole 46 in the stub shaft 30 which is situated substantially centrally thereof and the weld roll 6 is mounted to the stub shaft by means of a bolt 47 which extends through the hole 44 in the weld roll 6 and is screwed into the threaded hole 46. The weld roll 6 and the carriage 26 on the other side of the weld box 20 have exactly the same structure.

The distance between the weld rolls 6 may be adjusted by means of a threaded shaft 48 which has portions 49 and 50 with opposing threads on either side of an unthreaded portion 51. Each of the respective portions 49 and 50 passes within threaded holes 52 and 53 in each carriage 26 so that when the shaft is turned in a given direction, the weld rolls will either move closer together or further apart. A micrometer type dial 54 is provided for accurately adjusting the distance between the weld rolls.

In accordance with this invention it has been found that when one employs high frequency induction welding for welding copper and copper base alloy strip into tubing, it is necessary to use high power levels because of the high conductivity and low magnetic permeability of the copper and copper base alloys. The induction coil 10 as in FIG. 1 which supplies the current to the tube edges 3 and 4 which are to be welded together is situated as close as possible immediately in front of the weld rolls 6 and, therefore, is in close proximity to the weld box 20 of FIG. 2 which holds the weld rolls.

In weld boxes 20 previously constructed in the prior art only the weld rolls 6 were formed of non-magnetic metals having high conductivity. All of the other metal parts of the weld box 20 such as the bottom plate 22, side walls 23 and end walls 24 which make up its frame, the carriage 26, the stub shaft 30, the bearings 31 and 32 and various other parts were made of metals having high magnetic permeability and low conductivity such as steel. Since the induction coil 10 is situated very close to these parts, a significant amount of the inducible current from the induction coil was drawn off by these parts by induction. The current induced in the parts of the weld box 20 causes them to heat up due to their low conductivity with their consequent expansion. The expansion of these parts changes the mechanical alignment of the weld box 20 and weld rolls 6 resulting in a mechanical instability at the weld rolls which can cause defective or poor quality welds. This drawing off of a portion of the inducible current from the coil 10 can also cause a variation in the current induced in the strip edges 3 and 4 resulting in an electrical instability which also has a deleterious effect on weld quality especially for alloys having a narrow liquidus to solidus temperature range.

The efficiency of the welding apparatus is further decreased because the substantial portion of the inducible current from the coil 10 which is induced in the weld box 20 parts rather than the strip edges 3 and 4 causes a slower rate of welding. This reduction in the rate of welding causes a further deterioration in weld quality since the effects of the aforenoted mechanical and electrical instabilities are more noticeable and it also increases the width of the heat affected zone of the weld.

A further problem which occurs in conventional weld boxes 20 is that a portion of the current which is induced in the strip edges 3 and 4 is drawn off by short circuit paths in the weld box itself. As described with respect to FIG. 1, the current is induced in one strip edge 3 or 4 and travels to the weld point 7 and back the opposite strip edge 3 or 4 to complete the circuit. The circuit could also be completed by current flow about the outside circumference of the tube 2 and impeders I are used to increase the impedance of this path so as to reduce such current losses. However, current may also be drawn off from the strip edges by means of other short circuit paths which can be found in the weld box 20.

Referring again to FIG. 2, a portion of the current could be drawn from the strip edges 3 and 4 by flowing from one of the edges to the opposite edge through the short circuit path which occurs in the following sequence of weld box 20 parts: weld rolls 6, stub shaft 30, bearings 31 and 32, carriage 26, side walls 23, opposing carriage 26, opposing bearings 31 and 32, opposing stub shaft 30 and opposing weld roll 6. This path is similar to the path around the circumference of the tube 2; however, the impedance of this path is not significantly affected by the use of an impeder I and, therefore, a portion of the induced current in the strip edges 3 and 4 is drawn off through this short circuit path as enumerated.

In other weld box designs, other short circuit paths are also found to exist, for example, the stub shaft 30 could extend completely through the weld roll 6 and its upper portion could be held in a suitable bushing or bearing mounted in a suitable bracket or bracing mechanism not shown. The purpose of such a construction would be to further add to the mechanical stability of the weld rolls 6. If the bracing of each of the weld rolls were connected together in some manner a short circuit path again would result. Similarly, in other weld box designs employing more than two weld rolls even more short circuit paths are generally found to exist. By drawing current from the strip edges, these short circuit paths reduce the efficiency of the welding apparatus with a consequent reduction in welding speeds.

Figure 3:
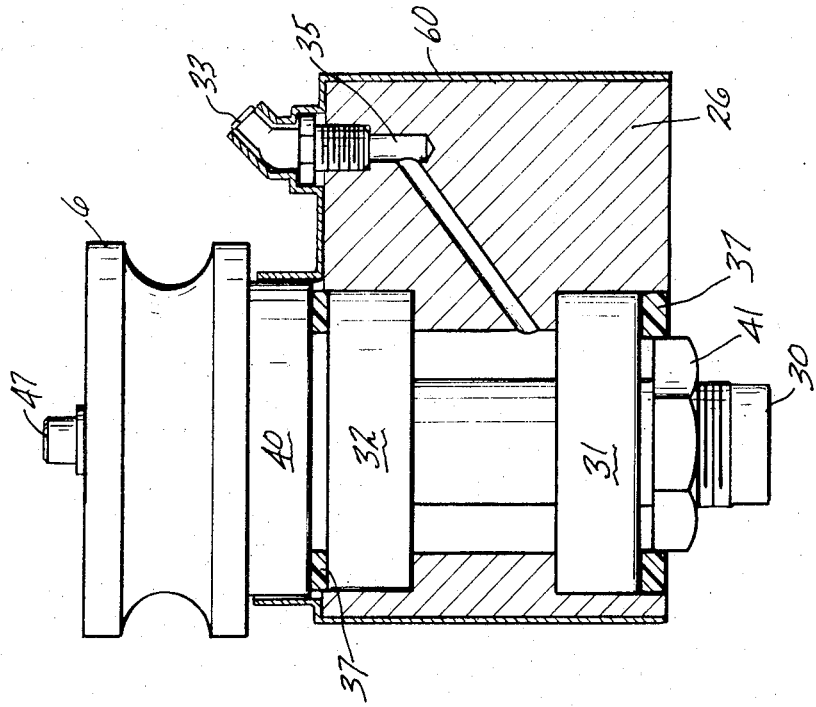
FIG. 3 is a partial cross sectional view of a weld roll subassembly from the weld box of FIG. 2 wherein a non-magnetic shielding has been applied to magnetic parts of the subassembly.

To overcome the aforenoted problems in accordance with one embodiment of this invention, a non-magnetic metallic shielding having high conductivity has been interposed between the magnetic parts of the weld box 20 and those of low conductivity and the induction field of the coil 10. FIG. 3 shows an example of how the shielding can be interposed. As shown in FIG. 3, a shielding metal 60 has been placed about the exposed surfaces of the carriage 26 and stub shaft 30. Preferably, the shielding metal 30 should be a sheet at least 0.030 inch thick which has a low magnetic permeability and high conductivity. Copper sheet has been found to be highly effective for this purpose. Preferably, the shielding metal 60 should be at least 0.040 inch thick.

While FIG. 3 merely shows the use of shielding about the exposed surfaces of the weld roll carriage 26 and stub shaft 30, it is evident that the shielding would also be applied about the side walls 23 and end walls 24 and other exposed parts of the weld box 20. The shielding 60 is preferably applied over all the visible surfaces of the magnetic parts and those parts having low conductivity of the weld box 20; however, it is only necessary that it be applied to those surfaces which are exposed to and are in close proximity to the induction coil 10 which would normally be the front portion of the weld box 20 as viewed in FIG. 2.

The shielding metal 60 may be applied to the exposed surfaces of the magnetic parts of the weld box 20 in any desired manner. Therefore, for example, copper sheet 60 could merely be bent in a suitable form and placed over the respective parts of the weld box 20 which are to be shielded. Alternatively, the shielding metal 60 could be clad on the exposed surfaces of these parts or otherwise secured to these surfaces by means well known in the art. It is only essential that the shielding should be interposed between the aforenoted parts of the weld box 20 and the induction field of the coil 10.

While it has been found that shielding the magnetic parts and low conductivity parts of the weld box 20 with non-magnetic metals having high conductivity is effective to reduce the aforenoted current losses, it has been found in accordance with the most preferred embodiment of this invention that a further improvement can be effected by forming those parts of the weld box 20 formerly made of magnetic metals and low conductivity metals such as the stub shaft 30, the weld roll 6, the carriage 26 and the weld box frame-work consisting of the side walls 23, end walls 24 and bottom plate 22 and possible even the adjusting screw, of non-magnetic metals having high conductivity, preferably, copper or copper base alloys such as aluminum-bronze.

By forming the weld box 20 substantially completely from non-magnetic metals, there is a substantial drop in the aforenoted current losses from the induction coil 10 and a substantial improvement in the efficiency of the welding apparatus, thereby permitting higher rates of welding with improved weld quality. Further, weld box 20 parts constructed of copper and copper base alloys which have high conductivity are not susceptable to being heated up as much as steel parts, thereby substantially eliminating the mechanical instability associated with prior weld boxes.

In the weld box 20 of FIG. 2, the bearings 31 and 32 are fairly weld shielded from the induction field of the coil 10 by the carriage 26 and stub shaft flange 40. This then represents the most preferred arrangement for the bearings 31 and 32. It is common in the art, however, to have the bearings held within the weld rolls so that the weld rolls revolve about a fixed shaft. Such a construction is markedly inferior to the type of arrangement shown in FIG. 2 which is preferred in accordance with this invention.

Figure 4:
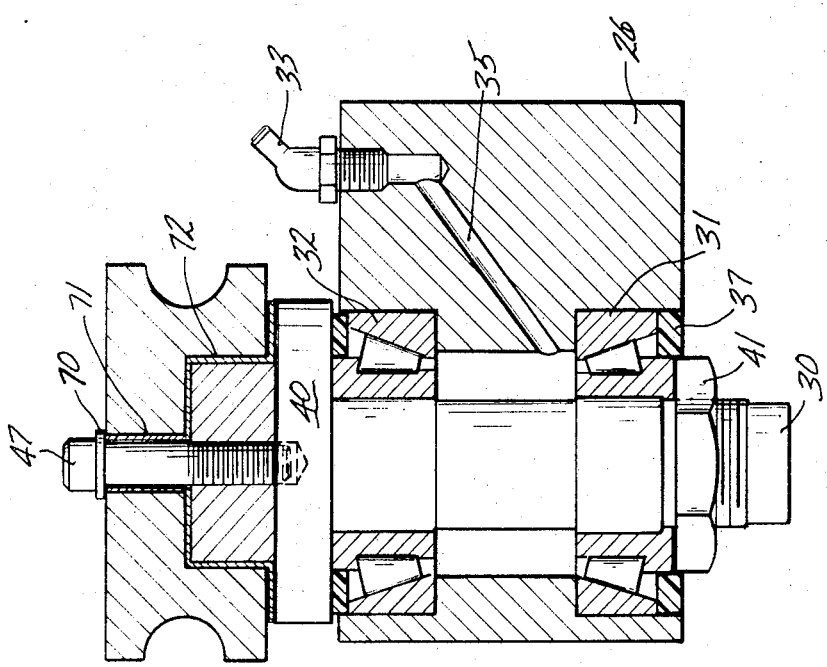
FIG. 4 is a partial cross sectional view of the weld roll subassembly from the weld box of FIG. 2 wherein insulation has been interposed between the weld roll and the remainder of the subassembly so as to eliminate a short circuit path within the weld box.

The overall efficiency of the weld box 20 may be still further improved by eliminating short circuit paths in the weld box as by providing insulation between some parts in the aforenoted short circuit paths in the weld box. In order to maintain sufficient mechanical stability at the weld rolls 6, it is necessary that this insulation be positioned between parts of the weld box 20 in the short circuit path which do not move with respect to each other. For example, in the weld box 20 of FIG. 2, the insulating could be provided between the weld roll 6 and the stub shaft 30 as shown in FIG. 4 since these two components do not move with respect to one another.

The bolt 47 which secures the weld roll 6 to the stub shaft 30 would be insulated from the weld roll 6 by an insulating washer 70 and an insulating collar 71 in the hole 44. The weld roll 6 itself would be insulated from the stub shaft 30 by an insulating cup 72 placed over the hub 42 and extending over the flange 40 of the stub shaft.

The particular insulating material may be chosen as desired from many well known materials, as for example, Teflon or nylon.

In other weld box designs, the short circuit paths could be eliminated in a like manner by placing insulating means between two of the parts of the weld box in the short circuit path or paths which do not move with respect to each other.

Therefore, in summary, in accordance with this invention, a weld box has been provided for high frequency welding having markedly improved electrical efficiency and mechanical stability thereby permitting the welding of strip into the tubing at higher speeds. The weld box is particularly applicable to the welding of copper and copper base alloys and other non-magnetic alloys having relatively high conductivities.

The aforenoted improvements are obtained either by shielding the aforenoted exposed components of the weld box with a non-magnetic metal having high conductivity or by forming those components of the prior art weld boxes of non-magnetic metals having high conductivity or by eliminating short circuit paths in the weld boxes by suitably insulating parts of the weld box in the short circuit paths which do not move with respect to one another or a combination of these embodiments.

A magnetic material or metal as the term is used in the above description is defined as one which has a high magnetic permeability $\mu$ generally in excess of 10,000 oersteds. A non-magnetic material or metal as above described refers to one which has a low magnetic permeability $\mu$ less than 10 oersteds and preferably approximately about 1.

Exposed parts of the weld box in the above description are those parts which are exposed to the induction field of the coil and its associated electrical lead in connectors (not shown), namely those parts of the weld box in which current can be induced by the action of the induction coil and/or its lead system.

Conductivity as the term is used in this application refers to both electrical and thermal conductivity. A metal having a high conductivity is one which has an electrical conductivity of at least 15% IACS and preferably at least 25% IACS; and a thermal conductivity of at least 25 B.t.u./sq. ft./ft./hr./°F and preferably at least 35 B.t.u./sq. ft./ft./hr./°F.

The steels referred to in the above description can be any well known steel or steel alloy. While the invention has been described with reference to the preferred use of copper or copper base alloys as replacement metals, other non-magnetic metals could be employed with high conductivity.

The invention is equally applicable as aforenoted to high frequency welding employing contacts in place of an induction coil. The electrical lead in system connected to the contacts is subject to inductive current losses in the weld box parts in a manner similar to the induction coil and its lead in system.

While the invention has been described with reference to the welding of metal strip into tube it is also applicable to other high frequency welding applications such as, for example, the welding of structurals and dissimilar metals.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In an apparatus for high frequency welding copper or copper base alloys, said apparatus including means for heating said copper or copper base alloys to the welding temperature along a weld seam and a weld box in close proximity to said heating means, said weld box receiving said copper or copper base alloys from said heating means and forge welding said copper or copper base alloys along said weld seam, said weld box comprising a plurality of metal parts having a high magnetic permeability and low conductivity, including a metal frame, at least two carriages adjustably supported by said frame, at least one rotatable shaft adapted to receive a weld roll supported by each of said carriages, the improvement wherein substantially all of said parts including said frame, said carriages, said rotatable shafts, and said weld rolls which are exposed to the induction field of said heating means are constructed from at least one non-magnetic metal having a magnetic permeability of less than 10 oersteds, a thermal conductivity of at least 25 B.t.u./sq. ft./ft./hr./F°, and an electrical conductivity of at least 15% IACS.

2. In an apparatus as in claim 1 the further improvement wherein said metal or metals comprise strip which is to be welded into tube.

3. In an apparatus as in claim 1, the further improvement wherein said non-magnetic metal has a magnetic permeability of less than 1 oersteds.

4. In an apparatus as in claim 2, the further improvement wherein said non-magnetic metal has a thermal conductivity of at least 35 B.t.u./sq. ft./ft./hr./°F and an electrical conductivity of at least 25% IACS.

5. In an apparatus as in claim 4, the further improvement wherein said non-magnetic metal is a copper or copper base alloy.

6. In an apparatus as in claim 5, the further improvement wherein said copper base alloy comprises an aluminum-bronze.

7. In an apparatus as in claim 2 said metal strip being received by said weld box in the form of an open tube having a longitudinally extending gap therein defined by the strip edges, said weld box further including at least one short circuit path in said metal parts by which the current induced in a strip edge on one side of said gap may flow to the strip edge on the other side of said gap, the further improvement wherein said at least one short circuit path is substantially eliminated by placing insulating means between at least two of said metal parts which do not move with respect to one another.

8. In an apparatus as in claim 7, the further improvement wherein said insulating means comprises a material selected from the group consisting of nylon or Teflon.

9. In an apparatus as in claim 8, the further improvement wherein said insulating means is interposed between said weld roll and said shaft.

10. In an apparatus for high frequency welding copper or copper base alloys, said apparatus including means for heating said copper or copper base alloys to the welding temperature along a weld seam and a weld box in close proximity to said heating means, said weld box receiving said copper or copper base alloys from said heating means and forge welding said copper or copper base alloys along said weld seam, said weld box comprising a plurality of metal parts having a high magnetic permeability and low conductivity, including a metal frame, at least two carriages adjustably supported by said frame, at least one rotatable shaft, adapted to receive a weld roll supported by each of said carriages, the improvement wherein a shielding comprising a non-magnetic metal sheet having a magnetic permeability of less than 10 oersteds, a thermal conductivity of at least 25 B.t.u./sq. ft./ft./hr./F° and an electrical conductivity of at least 15 IACS is applied to those parts of the weld box which are exposed to the induction field of said heating means.

11. In an apparatus as in claim 10, the further improvement wherein said metal or metals comprise strip having longitudinally extending edges for welding into tube.

12. In an apparatus as in claim 10, the further improvement wherein said non-magnetic metal shielding has a magnetic permeability of less than 1 oersteds.

13. In an apparatus as in claim 11, the further improvement wherein said non-magnetic metal shielding has a high thermal conductivity of at least 35 B.t.u./sq. ft./ft./hr./°F, and an electrical conductivity of at least 25% IACS.

14. In an apparatus as in claim 13, the further improvement wherein said non-magnetic metal shielding is copper or a copper base alloy.

15. In an apparatus as in claim 14, the further improvement wherein said magnetic metal shielding comprises copper sheet at least 0.030 inch thick.

16. In an apparatus as in claim 15, the further improvement wherein said copper sheet is at least 0.040 inch thick.

* * * * *